R. F. METCALFE.
ENGINE.
APPLICATION FILED OCT. 27, 1919.
1,406,205.
Patented Feb. 14, 1922.
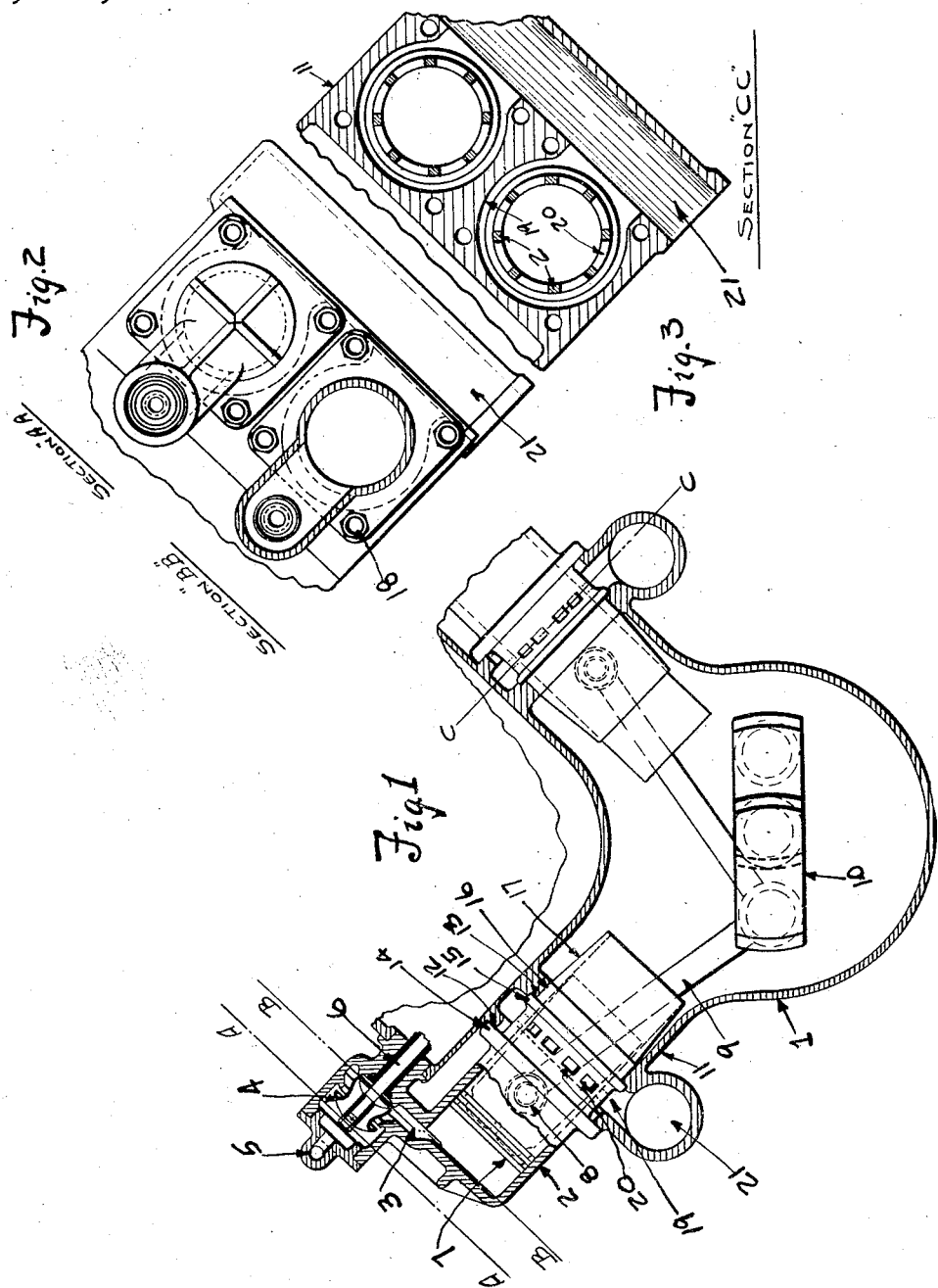

UNITED STATES PATENT OFFICE.

ROBERT F. METCALFE, OF ERIE, PENNSYLVANIA.

ENGINE.

1,406,205.  Specification of Letters Patent.  Patented Feb. 14, 1922.

Application filed October 27, 1919. Serial No. 333,792.

*To all whom it may concern:*

Be it known that I, ROBERT F. METCALFE, a citizen of the United States, residing at Erie, in the county of Erie and State of Pennsylvania, have invented new and useful Improvements in Engines, of which the following is a specification.

This invention is designed to provide a very desirable form of engine cylinder, particularly a steam engine cylinder of the single-acting una-flow type and such a cylinder is shown as exemplifying the invention.

The invention is illustrated in the accompanying drawings as follows:—

Fig. 1 shows a vertical cross section through the crank case and cylinder.

Fig. 2 is a section, the upper cylinder being a section on the line A—A in Fig. 1 and the lower cylinder being a section on the line B—B in Fig. 1.

Fig. 3 a section of the cylinders on the line C—C in Fig. 1.

1 marks the crank case, 2 the cylinder, 3 the inlet to the cylinder, 4 a valve controlling the admission of steam, 5 the steam passage, 6 a stem controlling the valve, and 7 a piston operating in the cylinder and connected by the usual connecting rod pin 8 with the connecting rod 9, the connecting rod operating on a crank 10. The crank case has a cylinder projection 11 and this is provided with the seats 12 and 13. The cylinder is provided with the shoulders 14 and 15 which rest secured on the seats 12 and 13 respectively. The projection 11 has an opening 16 just below the seat 13 and the cylinder forms a fit in this opening. Below this opening the cylinder is preferably tapered. Ordinarily a gasket is arranged under the shoulder 15 and a close pressure fit is made of the shoulder 14. The shoulder 14 may be secured to the frame in any convenient manner. An annular chamber 19 is formed between the shoulders 12 and 13 and the exhaust ports 20 open from the cylinder into this annular chamber. The exhaust ports communicate with an exhaust manifold 21.

As shown the engine is a four cylinder single-acting engine, the cylinders being set at ninety degrees and operating on the double throw crank.

Difficulty is experienced when the cylinders are formed with the frame in the warping or yielding of the walls after they are finished. In the present device the cylinder is formed separately and thus is relieved very largely of strain. It may be rough finished, heat treated and allowed to take its final shape before it is finally finished. The power end of the cylinder extends upwardly and the thrust in the working of the engine is sustained entirely by the seat or shoulder 14. With a una-flow engine the difference in temperature at the power end and the opposite end of the cylinder is quite great. By supporting the cylinder at the center the power end of the cylinder is free to expand with the differences of temperature. Further inasmuch as the cylinder at the point in the walls in which the exhaust ports are formed is not subjected to undue strain ample exhaust ports may be provided. The structure, therefore, is one convenient for manufacture, one that can be made with great lightness and still great strength and one that may be readily mounted.

It will be noted that with this construction the part of the cylinder from the shoulder 14 to the open end is free from obstructions so that it can be machined throughout. This feature of construction is of great importance because such construction to a very large extent prevents the distortion of the cylinder through the release of strains in the metal. This is particularly true of that part of the cylinder which has the ports 20 because the walls here are very much reduced. By the machining of the metal so as to give the walls a uniform thickness throughout at each of the successive diameters formed by the structure the distortion of the cylinder through warping is almost entirely eliminated.

What I claim as new is:—

1. In an engine, the combination of a frame having two circumferential seats spaced apart, one a supporting seat and the other a closing seat; a chamber opening to the space between the seats; and a cylinder having a shoulder resting on and making closure with the supporting seat, the power end of the cylinder extending in a direction from the supporting seat opposite the closing seat and the opposite end of the cylinder extending through the supporting seat and the closing seat and making closure with the closing seat, the cylinder having exhaust ports extending through its wall into the space between the seats.

2. In an engine, the combination of a frame having two circumferential seats spaced apart, one a supporting seat and the other a closing seat; a chamber opening to the space between the seats; and a cylinder having a shoulder resting on and making a closure with the supporting seat and sustaining the power thrust on the cylinder through said seat, the power end of the cylinder extending in a direction from the supporting seat opposite the closing seat and the opposite end of the cylinder extending through the supporting seat and the closing seat and making closure with the closing seat, the cylinder having exhaust ports extending through its wall into the space between the seats.

3. In an engine, the combination of a frame having a plurality of sets of cylinder seats in axial alinement, each set having two circumferential seats spaced apart, one a supporting seat and the other a closing seat, said frame having chambers opening to the spaces between the seats and a cylinder for each set of seats, each cylinder having a shoulder resting on and making closure with the supporting seat, the power end of the cylinder extending in a direction from the supporting seat opposite the closing seat and the opposite end of the cylinder extending through the supporting seat and closing seat and making closure with the closing seat and having exhaust ports extending through its walls into the space between the seats; and an exhaust manifold leading from said chambers.

4. In an engine, the combination of a frame having two circumferential seats spaced apart, one a supporting seat and the other a closing seat; a chamber opening to the space between the seats; and a cylinder having a shoulder resting on and making closure with the supporting seat, the power end of the cylinder extending in a direction from the supporting seat opposite the closing seat and the opposite end of the cylinder extending through the supporting seat and the closing seat and making closure with the closing seat, the cylinder having exhaust ports extending through its wall into the space between the seats, the walls of the cylinder extending from the supporting seat through the closure seat being machined to make its outer and inner surfaces concentric.

In testimony whereof I have hereunto set my hand.

ROBERT F. METCALFE.